United States Patent
Weigele et al.

(10) Patent No.: US 6,435,295 B1
(45) Date of Patent: Aug. 20, 2002

(54) RADIATOR ASSEMBLY FOR INTERNAL COMBUSTION ENGINES OF AN AUTOMOBILE

(75) Inventors: Hans Weigele, Stuttgart; Dieter Zaremba, Mühlacker, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/576,855

(22) Filed: May 22, 2000

(30) Foreign Application Priority Data

May 20, 1999 (DE) .......................................... 199 23 098

(51) Int. Cl.$^7$ .............................................. B60K 11/04
(52) U.S. Cl. ...................................... 180/68.4; 180/68.6
(58) Field of Search ............................. 180/68.4, 68.5, 180/68.6; 165/129

(56) References Cited

U.S. PATENT DOCUMENTS

| | | | |
|---|---|---|---|
| 5,046,550 A | * 9/1991 | Boll et al. | 180/68.4 |
| 5,271,473 A | * 12/1993 | Ikeda et al. | 180/68.4 |
| 5,359,969 A | * 11/1994 | Dicktrell et al. | 123/41.12 |
| 5,460,420 A | * 10/1995 | Perkins et al. | 293/106 |
| 5,816,350 A | * 10/1998 | Akira et al. | 180/68.4 |

FOREIGN PATENT DOCUMENTS

| | | |
|---|---|---|
| DE | 2931812 | 2/1981 |
| DE | 3930076 | 2/1991 |
| DE | 19602186 | 5/1997 |

* cited by examiner

Primary Examiner—Douglas Hess
Assistant Examiner—Elaine Gort
(74) Attorney, Agent, or Firm—Crowell & Moring LLP

(57) ABSTRACT

A radiator intended for an internal combustion engine or assemblies thereof is installed in an end area of a body of a motor vehicle, especially an automobile, in a space delimited by the outside walls of the body. The outside wall has shape sections that run at angles to one another, to which the radiator is then adapted at least areawise by its outside contour to produce advantageous installation conditions for the radiator.

26 Claims, 2 Drawing Sheets

RADIATOR ASSEMBLY FOR INTERNAL COMBUSTION ENGINES OF AN AUTOMOBILE

BACKGROUND AND SUMMARY OF THE INVENTION

This application claims the priority of German application 199 23 098.6, filed May 20, 1999, the disclosure of which is expressly incorporated by reference herein.

The invention relates to a radiator for internal combustion engines or assemblies thereof, installed in use in an automobile end area defining a chamber to received the radiator.

A known radiator of this general type, disclosed in German Patent Document DE 39 30076 C1, is built into the nose of a motor vehicle and has a rectangular basic shape with boxes being provided on the upright sides of the radiator. Warmed medium is supplied through the boxes to the radiator and cooled medium is carried away. Although it can be assumed that the radiator has a specific cooling effect, its basic shape because it is rectangular makes it difficult to accommodate in a space in the motor vehicle nose surrounded by outside walls that meet at an angle between which a relatively wide curve runs.

A goal of the invention therefore is to design the radiator so that with a good cooling function it can be integrated advantageously into a given body structure of the motor vehicle that includes certain outside walls.

According to the invention, this goal is achieved by an arrangement wherein the vehicle body end area has a laterally curved configuration and wherein outer contours of the radiator are matched to the facing vehicle body contours.

Primary advantages achieved with the invention result from the fact that the radiator on the sides facing the outside walls of a motor vehicle has an outside contour adapted to said outside walls or to a given body shape design which contributes to a good utilization of space. Certain preferred embodiments of the invention also provide for making a supply line of the radiator curved and dimensioning the area of the radiator through which flow occurs accordingly. The outlet line from the radiator can be designed In the same way when the adjacent outside wall makes this advantageous. The fact that the supply line and the outlet line are provided on the top side or the bottom side of the radiator body permits a simple connection with corresponding connecting lines that run between the internal combustion engine and the radiator.

Other objects, advantages and novel features of the present invention will become apparent from the following detailed description of the invention when considered in conjunction with the accompanying drawings.

DETAILED DESCRIPTION OF THE DRAWINGS

Figure 1:
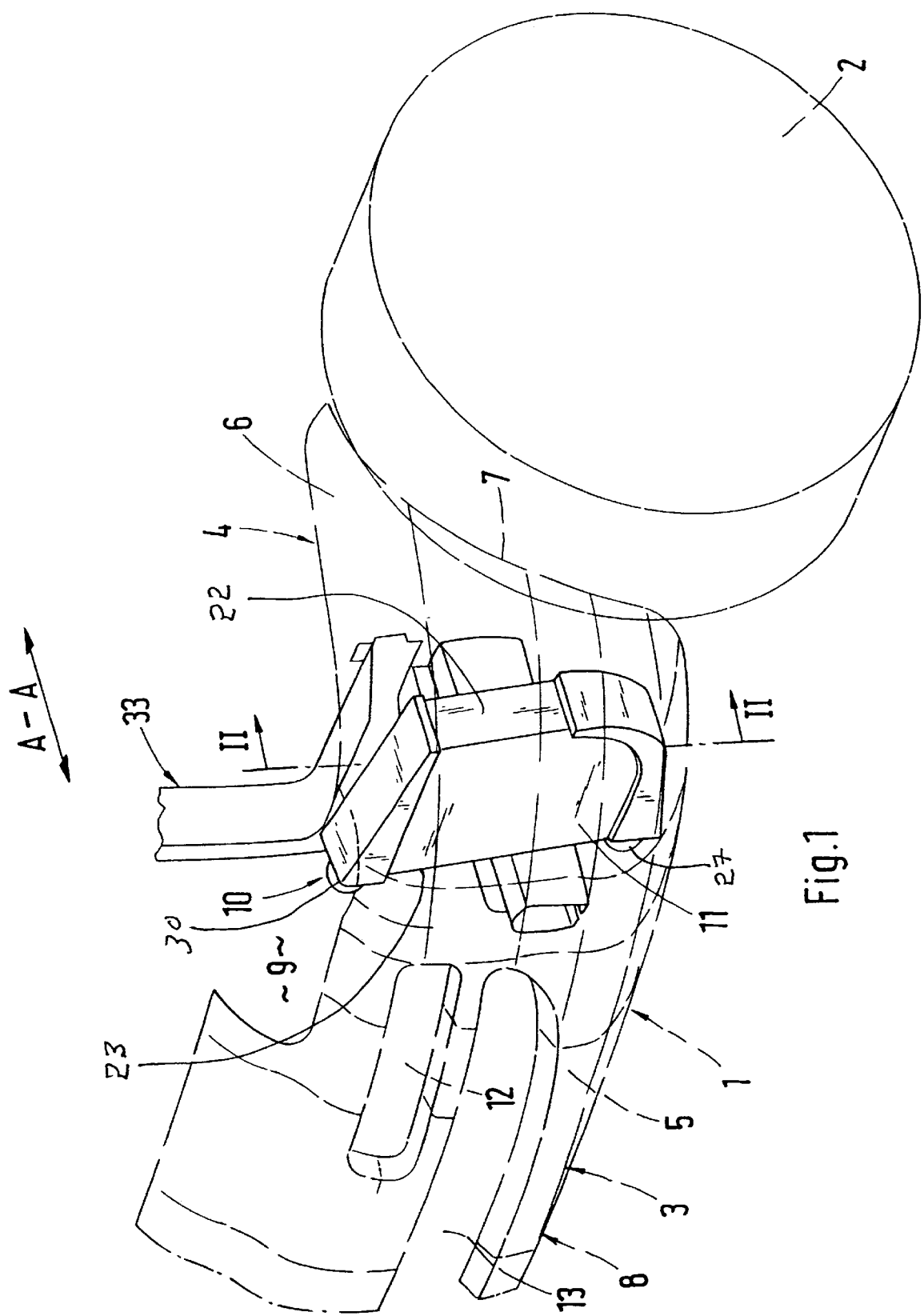
FIG. 1 is a schematic partial diagonal view from the right front of an automobile with a radiator assembly constructed according to preferred embodiments of the invention.

An automobile 1 in the area shown has a wheel 2 and a nose 3 of a body 4. The nose 3 is defined by exterior skin sections 5, 6 which are part of a nose and parts 8 extending between wheel cutouts 7. In a space 9 of the nose 3 delimited by the outside skin sections 5,6, a radiator 10 with an approximately rectangular cross section is installed in front of wheel 2 as viewed in the direction of travel, whose longer sides 11 run transversely to the lengthwise direction A—A of the vehicle. However, radiator 10 which is a boost air radiator that optimizes the charging input of an internal combustion engine, not shown, extends essentially vertically. Air inlets 12 and 13 are provided in the outer skin section 5 for the radiator 10.

Figure 2:
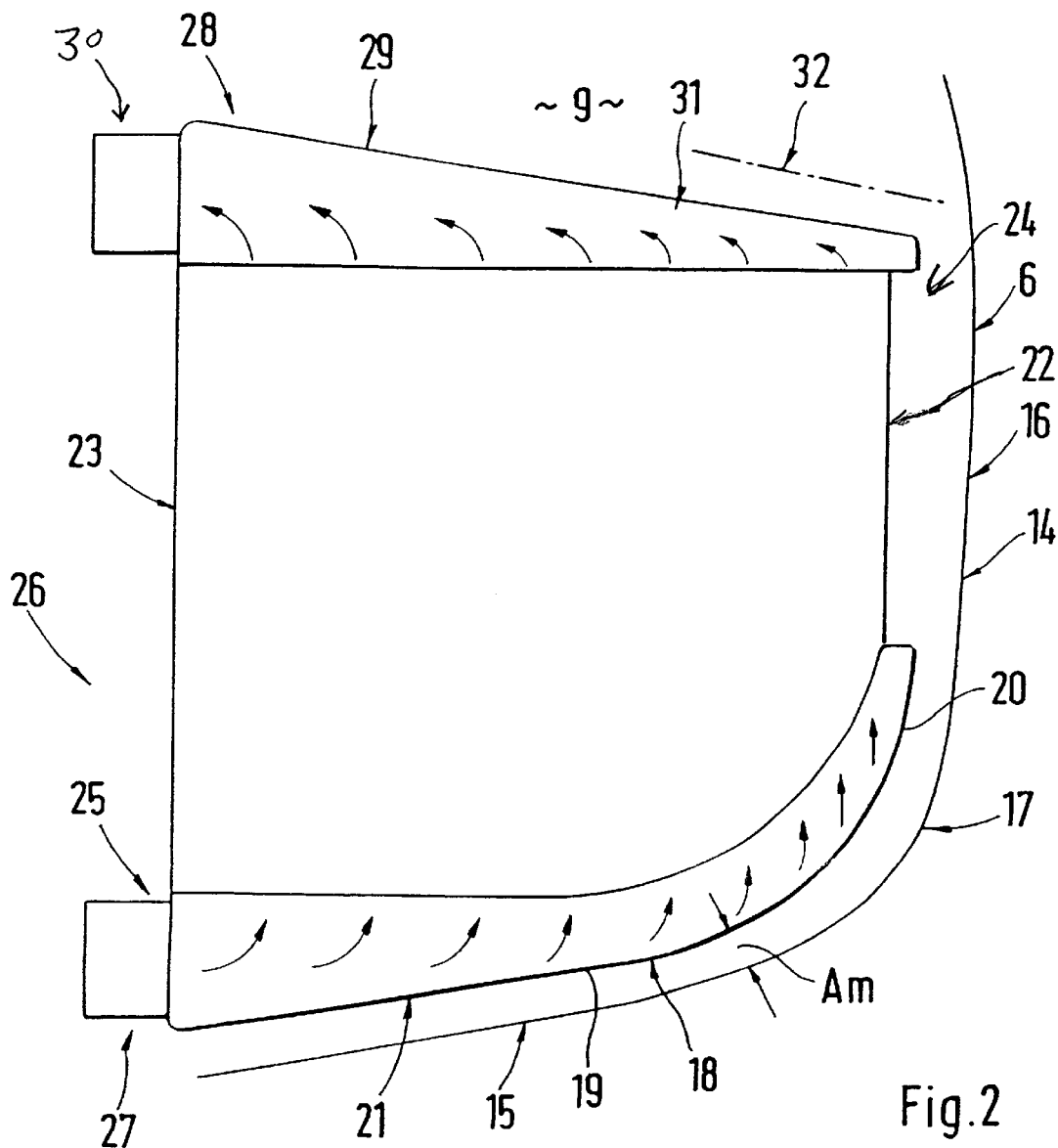
FIG. 2 is a sectional view along line II—II in FIG. 1.

According to FIG. 2, outer skin section 6 has an outside wall 14 that has a first shape section 15 that runs transversely to the lengthwise central plane of the vehicle (not shown) and a second upright shape section 16. Shape sections 15 and 16 are bulging or convex. Between the first shape section 15 and the second shape section 16 which run at an angle to one another, a third shape section 17 is provided as a rounded part. An outside contour 18 of the radiator 10 is adapted to the shape sections 15, 16, 17 from the inside of space 9. An approximately constant distance Am between shape sections 15, 16, 17 and outside contour 18 is relatively small so that radiator 10 is brought close to the outer skin section 6.

Outside contour 18 comprises a first outside contour section 19 and a second outside contour section 20 which form the exterior of a feed line 21 of the radiator 10 and extend along the first shape section 15 and the third shape section 17. Feed line 21 which is curved by this design delimits a bottom side 25 of a radiator body 24 that has upright side walls 22, 23. Supply line 21 is provided on side 26 that is opposite shape section 16 with a connecting stub 27 through which air enters supply line 21 and radiator body 24 from a turbocharger, not shown.

Radiator body 24, on the side 28 that is located at a distance from the supply line 21 has an outlet line 29 which likewise delimits the radiator body 24 and on side 26 has a connecting stub 30 through which cooled air is conducted to the intake system of the internal combustion engine, not shown. An outside shape section 31 of outlet line 29 is adapted to a fourth shape section of outside wall 12, represented by a dot-dashed line similarly to the way in which outside contour 18 is adapted to the corresponding facing shape sections of the body.

Finally, radiator 10 is fastened by suitable means to an existing support structure 33 of the body 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A radiator assembly for a vehicle of the type having a radiator receiving chamber formed by a vehicle body having vehicle lateral body side wall sections including lower first and upper second angularly inclined lateral body side wall sections joined by a third curved body side wall section to form a laterally outwardly bulging curved vehicle body section, said radiator having an outer contour transverse to the direction of travel which is shaped such that a substantially constant width gap extends between the first, second and third body side wall sections and respective facing outer contour surfaces of the radiator when the radiator is installed in an in use position in the vehicle.

2. A radiator according to claim 1,
wherein the first body wall section extends transversely of the vehicle body,
wherein the second body wall section extends vertically, and the third body wall section is a rounded section, said body wall sections forming a laterally outwardly bulging nose of the vehicle body, and wherein the radiator outer contour is configured to be positioned close to the respective facing body wall sections.

3. A radiator according to claim 2, wherein a supply line of the radiator forms a first outer contour section which in use faces the first body wall section and a second outer contour section which faces at least a part of the third body wall section.

4. A radiator according to claim 3, wherein the radiator outer contour includes a first vertically extending side wall extending along the second body wall section and a second vertically extending side wall spaced from the first side wall, and wherein an inlet to the supply line is disposed at a lower side of the second side wall and an outlet line is disposed at an upper side of the second side wall.

5. A radiator according to claim 4, wherein the outlet line forms an upwardly facing contour which in use conforms to and faces a fourth body wall section of the vehicle body.

6. A radiator according to claim 5, wherein the supply line and the outlet line have connecting stubs provided on the second side wall.

7. A radiator according to claim 2, wherein the first, second and third vehicle body wall sections form a nose section disposed in front of a front vehicle wheel.

8. A radiator according to claim 1, wherein a supply line of the radiator forms a first outer contour section which in use faces the first body wall section and a second outer contour section which faces at least a part of the third body wall section.

9. A radiator according to claim 8, wherein the radiator outer contour includes a first vertically extending side wall extending along the second body wall section and a second vertically extending side wall spaced from the first side wall, and wherein an inlet to the supply line is disposed at a lower side of the second side wall and an outlet line is disposed at an upper side of the second side wall.

10. A radiator according to claim 9, wherein the outlet line forms an upwardly facing contour which in use conforms to and faces a fourth body wall section of the vehicle body.

11. A radiator according to claim 10, wherein the supply line and the outlet line have connecting stubs provided on the second side wall.

12. A radiator according to claim 10, wherein the first, second and third vehicle body wall sections form a nose section disposed in front of a front vehicle wheel.

13. A radiator according to claim 9, wherein the first, second and third vehicle body wall sections form a nose section disposed in front of a front vehicle wheel.

14. A radiator according to claim 8, wherein the first, second and third vehicle body wall sections form a nose section disposed in front of a front vehicle wheel.

15. A radiator according to claim 1, wherein the first, second and third vehicle body wall sections form a nose section disposed in front of a front vehicle wheel.

16. A radiator according to claim 1, wherein the radiator is configured to be held in place by vehicle body supporting structure.

17. A radiator according to claim 1, wherein the radiator is a boost air cooler.

18. An automobile assembly comprising a vehicle body defining a radiator receiving chamber formed by vehicle lateral body side wall sections including lower first and upper second angularly inclined lateral body side wall sections joined by a third curved body side wall section to form a laterally outwardly bulging curved vehicle body section, said radiator having an outer contour transverse to a direction of travel which is shaped such that a substantially constant width gap extends between the first, second and third body side wall sections and the respective facing outer contour surfaces of the radiator when the radiator is installed in an in use position in the vehicle body.

19. An automobile assembly according to claim 18, wherein the first body wall section extends transversely of the vehicle body, wherein the second body wall section extends vertically, and the third body wall section is a rounded section, said body wall sections forming a laterally outwardly bulging nose of the vehicle body, and wherein the radiator outer contour is configured to be positioned close to the respective facing body wall sections.

20. An automobile assembly according to claim 19, wherein the first, second or third vehicle body wall section form a nose section disposed in front of a front vehicle wheel.

21. An automobile assembly according to claim 20, wherein the radiator is a boost air cooler.

22. An automobile assembly according to claim 18, wherein a supply line of the radiator forms a first outer contour section which in use faces the first body wall section and a second outer contour section which faces at least a part of the third body wall section.

23. An automobile assembly according to claim 22, wherein the radiator outer contour includes a first vertically extending side wall extending along the second body wall section and a second vertically extending side wall spaced from the first side wall, and wherein an inlet to the supply line is disposed at a lower side of the second side wall and an outlet line is disposed at an upper side of the second side wall.

24. An automobile assembly according to Claim 23, wherein the first, second or third vehicle body wall section form a nose section disposed in front of a front vehicle wheel.

25. An automobile assembly according to claim 24, wherein the radiator is a boost air cooler.

26. An automobile assembly according to claim 18, wherein the first, second and third vehicle body wall sections form a nose section disposed in front of a front vehicle wheel.

* * * * *